(12) United States Patent
Greenberg

(10) Patent No.: US 6,791,974 B1
(45) Date of Patent: Sep. 14, 2004

(54) UNIVERSAL INTERNET BASED TELEPHONY SYSTEM THAT PROVIDES UBIQUITOUS ACCESS FOR SUBSCRIBERS FROM ANY TERMINAL DEVICE

(75) Inventor: Jeffrey Douglas Greenberg, Fairfax, VA (US)

(73) Assignee: eStara, Inc., Reston, VA (US)

( * ) Notice: Subject to any disclaimer, the term of this patent is extended or adjusted under 35 U.S.C. 154(b) by 787 days.

(21) Appl. No.: 09/637,805

(22) Filed: Aug. 11, 2000

Related U.S. Application Data

(63) Continuation-in-part of application No. 09/272,139, filed on Mar. 19, 1999.

(51) Int. Cl.[7] .............................................. H04B 12/56
(52) U.S. Cl. ........................ 370/352; 370/401; 370/402
(58) Field of Search ................................ 370/352, 353, 370/354, 355, 356, 400, 401, 466, 402

(56) References Cited

U.S. PATENT DOCUMENTS

| | | | |
|---|---|---|---|
| 5,421,009 A | 5/1995 | Platt | |
| 5,604,737 A | 2/1997 | Iwami et al. | |
| 5,608,786 A | 3/1997 | Gordon | |
| 5,742,596 A | 4/1998 | Baratz et al. | |
| 5,751,706 A | 5/1998 | Land et al. | |
| 5,764,756 A | 6/1998 | Onweller | |
| 5,786,770 A | 7/1998 | Thompson | |
| 5,790,538 A | 8/1998 | Sugar | |
| 5,835,713 A | 11/1998 | FitzPatrick et al. | |

(List continued on next page.)

FOREIGN PATENT DOCUMENTS

| | | |
|---|---|---|
| EP | 0843 454 | 5/1998 |
| EP | 0 866 596 | 9/1998 |
| WO | WO 98/20667 | 5/1998 |

OTHER PUBLICATIONS

Hansson, A. et al. "Phone Doubler—A step towards integrated Internet and telephone communities", Ericsson Review, SE, Ericsson. Stockholm, No. 4, 1997, pp. 142–151, XP000725693, ISSN: 014–0171, pp. 149–151.

Primary Examiner—Wellington Chin
Assistant Examiner—William Schultz
(74) Attorney, Agent, or Firm—Piper Rudnick LLP; Steven B. Kelber

(57) ABSTRACT

The universal Internet based telephony system is implemented as a process that is accessible via an Internet WEB page and executes on the WEB server that hosts the WEB page and/or a back-end Internet telephony server which is accessed and controlled by the WEB server. The customer accesses the universal Internet based telephony system via any existing Java Enabled Internet Browser software resident on the customer's personal computer, either as an adjunct process thereon, or as a dedicated Internet telephony process. When a customer accesses the Internet WEB page and clicks on the universal Internet based telephony system icon, the WEB server on which the WEB page resides executes the resident universal Internet based telephony system hyperlink script and transfers a newly opened browser session to the universal Internet based telephony system WEB site. Once connected to the customer's personal computer, the universal Internet based telephony system WEB site presents the customer with the data entry fields for his/her account number the telephone number of the desired destination (called party). The WEB server uploads an applet to the customer's personal computer to run on the client machine without disturbing the customer's existing WEB page access, by opening up a separate window on the customer's personal computer for the Universal Internet based telephony system, to be seen and operated by the user. The universal Internet based telephony system WEB site then implements the Internet telephony communication connection between the customer's personal computer and the designated destination.

39 Claims, 9 Drawing Sheets

U.S. PATENT DOCUMENTS

| | | | |
|---|---|---|---|
| 5,838,665 A | 11/1998 | Kahn et al. | |
| 5,845,077 A | 12/1998 | Fawcett | |
| 5,850,433 A | 12/1998 | Rondeau | |
| 5,867,494 A | 2/1999 | Krishnaswamy et al. | |
| 5,867,495 A | 2/1999 | Elliott et al. | |
| 5,870,547 A | 2/1999 | Pommier et al. | |
| 5,870,610 A | 2/1999 | Beyda | |
| 5,875,296 A | 2/1999 | Shi et al. | |
| 5,883,891 A | 3/1999 | Williams et al. | |
| 5,889,774 A | 3/1999 | Mirashrafi et al. | |
| 5,892,764 A | 4/1999 | Riemann et al. | |
| 5,907,547 A | 5/1999 | Foladare et al. | |
| 5,909,545 A | 6/1999 | Frese, II et al. | |
| 5,919,247 A | 7/1999 | Van Hoff et al. | |
| 5,923,844 A | 7/1999 | Pommier et al. | |
| 5,941,957 A | 8/1999 | Ingrassia, Jr. et al. | |
| 5,944,791 A | 8/1999 | Scherpbier | |
| 5,953,322 A | 9/1999 | Kimball | |
| 5,953,331 A | 9/1999 | Duncan et al. | |
| 5,953,332 A | 9/1999 | Miloslavsky | |
| 5,956,334 A | 9/1999 | Chu et al. | |
| 5,970,065 A | 10/1999 | Miloslavsky | |
| 5,982,767 A | 11/1999 | McIntosh | |
| 5,987,102 A | 11/1999 | Elliott et al. | |
| 5,991,394 A | 11/1999 | Dezonno et al. | |
| 6,008,804 A | 12/1999 | Pommier et al. | |
| 6,011,792 A | 1/2000 | Miloslavsky | |
| 6,011,794 A | 1/2000 | Mordowitz et al. | |
| 6,026,087 A | 2/2000 | Mirashrafi et al. | |
| 6,031,896 A | 2/2000 | Gardell et al. | |
| 6,047,314 A | 4/2000 | Pommier et al. | |
| 6,049,671 A | 4/2000 | Slivka et al. | |
| 6,064,653 A | 5/2000 | Farris | |
| 6,064,667 A | 5/2000 | Gisby et al. | |
| 6,069,890 A * | 5/2000 | White et al. | 370/352 |
| 6,069,891 A | 5/2000 | Mandalia et al. | |
| 6,075,783 A | 6/2000 | Voit | |
| 6,075,784 A | 6/2000 | Frankel et al. | |
| 6,078,581 A | 6/2000 | Shtivelman et al. | |
| 6,078,582 A | 6/2000 | Curry et al. | |
| 6,118,864 A | 9/2000 | Chang et al. | |
| 6,122,255 A | 9/2000 | Bartholomew et al. | |
| 6,125,113 A | 9/2000 | Farris et al. | |
| 6,128,291 A | 10/2000 | Perlman et al. | |
| 6,141,341 A | 10/2000 | Jones et al. | |
| 6,141,345 A | 10/2000 | Goeddel et al. | |
| 6,144,670 A | 11/2000 | Sponaugle et al. | |
| 6,144,991 A | 11/2000 | England | |
| 6,199,096 B1 | 3/2001 | Mirashrafi et al. | |
| 6,212,192 B1 | 4/2001 | Mirashrafi et al. | |
| 6,298,056 B1 | 10/2001 | Pendse | |
| 6,304,637 B1 | 10/2001 | Mirashrafi et al. | |
| 6,310,941 B1 | 10/2001 | Crutcher et al. | |
| 6,337,858 B1 * | 1/2002 | Petty et al. | 370/356 |
| 6,611,590 B1 * | 8/2003 | Lu et al. | 379/265.09 |

\* cited by examiner

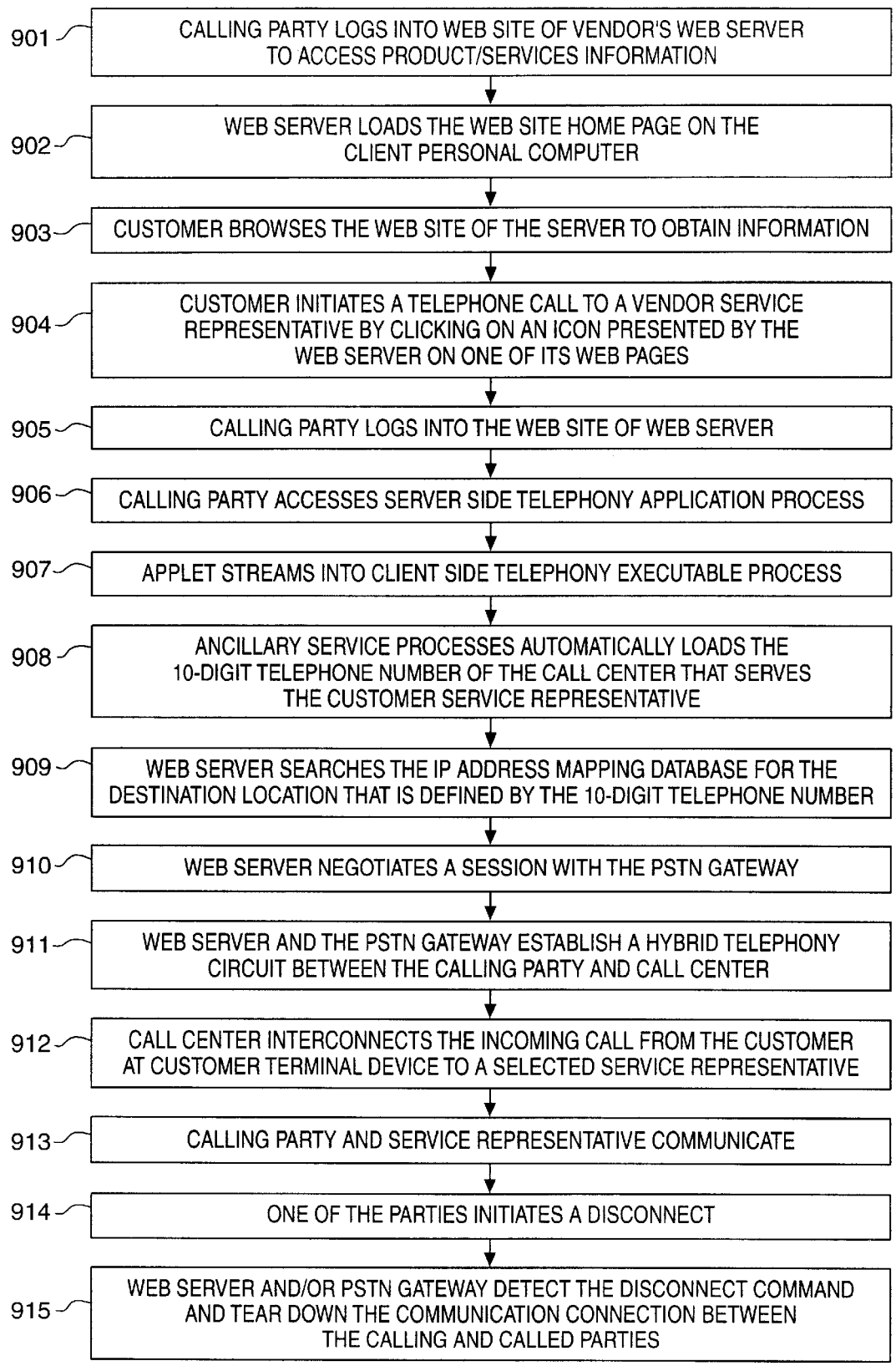

UNIVERSAL INTERNET BASED TELEPHONY SYSTEM THAT PROVIDES UBIQUITOUS ACCESS FOR SUBSCRIBERS FROM ANY TERMINAL DEVICE

This application is a Continuation-In-Part of application Ser. No. 09/272,139, filed Mar. 19, 1999, the entirety of which is incorporated herein by reference.

FIELD OF THE INVENTION

This invention relates to the provision of telephone service via the Internet and, in particular, to a system that enables a customer who accesses a WEB site on the Internet to initiate a telephone call via a WEB page user interface, from any location and from any multi-media personal computer (or other customer terminal device), without the need for the customer to have previously downloaded and accurately configured the client side internet provider specific telephony software for this telephone service on the customer's accessing personal computer.

PROBLEM

It is a problem in the field of Internet or IP telephony to provide customers with access to the telephone service without the need to have previously loaded and accurately configured Internet provider specific telephony software on the customer's accessing personal computer. IP telephony can be defined as using the "Internet Protocol" network of Internet connectivity, which reaches around the globe to all developed countries and most developing countries as the network to route telephone calls to PSTN or standard telephone switching networks. In reality, the Internet, the connectivity for which to the individual user is routed over PSTN networks. That is, people make local calls on a normal PSTN telephone line to an Internet Service Provider (ISP) and gain access to the rest of the Internet by utilizing TCP/IP or Internet standard protocols.

In operation, presently available Internet telephony service requires the customer to load an Internet telephony software package on the customer's personal computer in conjunction with establishing a billing account for this telephone service. This process executes on the customer's personal computer and enables the customer to access a specified and dedicated Internet telephony server to thereby obtain access to the Internet telephone service. The need to install Internet provider specific telephony software on the customer's personal computer represents an impediment to customers who access the Internet from various computers, since each personal computer used by the customer must be equipped with the same Internet provider specific telephony software. In addition, the existing dedicated Internet telephony software operates to the exclusion of other Internet access software, thereby failing to coordinate with other Internet accesses that the customer may wish to concurrently execute with the Internet telephony call. Thus, the presently available Internet telephony service represents an inexpensive alternative to standard long distance telephone service, but presents a number of constraints to the customer in order to obtain the benefits of low cost communications services.

A further problem with existing systems is that they are not adapted to be used in a cellular communication environment, nor are they capable of initiating a directory assistance function and automatic connection to a designated called party.

SOLUTION

The above described problems are solved and a technical advance achieved by the present universal Internet based telephony system which is implemented as a process that is accessible via an Internet WEB page and which executes on the WEB server that hosts the WEB page and/or a back-end Internet telephony server which is accessed and controlled by the WEB server. The customer accesses the universal Internet based telephony system via any existing Internet browser software resident on the customer's multimedia terminal device, such as a personal computer, either as an adjunct process thereon, or as a dedicated Internet telephony process. This is accomplished by presenting the universal Internet based telephony system to the customer as an accessible service option on any Internet WEB page, typically in the form of an icon presented thereon. Alternatively, the multimedia customer terminal device can be equipped with an icon which presents the universal Internet based telephony system to the customer as an accessible service option. When a customer, who has accessed the Internet WEB page either via the multimedia customer terminal device based icon or Internet browser, clicks on the universal Internet based telephony system icon, regardless of where the icon resides, the WEB server on which the WEB page resides executes the resident universal Internet based telephony system hyperlink script and transfers a newly opened browser session to the universal Internet based telephony system WEB site. Once connected to the customer's terminal device, the universal Internet based telephony system WEB site presents the customer with the data entry fields for their account number and the telephone number of the desired destination (called party). The WEB server uploads an applet to the customer's personal computer to run on the client machine without disturbing the customer's existing WEB page access, by opening up a separate window on the customer's terminal device for the Universal Internet based telephony system, to be seen and operated by the user. The universal Internet based telephony system WEB site then extends the Internet telephony communication connection from the customer's terminal device to an Internet telephony server/network, forwarding the customer provided data to enable the communication connection to be extended by the Internet telephony server/network to the designated destination.

Thus, the customer can access Internet telephony service through any hosting WEB server (where one of universal Internet based telephony system's affiliate links resides; and functions on any web page served up on the WEB) as the access point, and by using the existing Internet browser software that is resident on any multi-media terminal device. The customer's Internet login and password and the dynamic URL capture of the affiliate WEB site represent the universal Internet based telephony system billing data, which are provided by the customer from any terminal device. In addition, the universal Internet based telephony system process can be installed on any WEB server and the routing of the Internet telephony calls from the WEB server to the designated destination is implemented as a background process via an Internet telephony server/network, in a manner that is transparent to the customer if the customer chooses, as the universal Internet based telephony system page opens a new browser session in a new window which can be minimized during the conversation allowing the user to continue browsing the site from which he/she initiated the universal Internet based telephony system icon while talking to the called party.

Furthermore, the WEB page can present a plurality of universal Internet based telephony system icons, with the icons representing either general Internet telephony service access or "hard-wired" access to dedicated destinations.

Thus, the customer who accesses a particular WEB server that hosts a commercial enterprise can be provided with a plurality of universal Internet based telephony system icons which are representative of a number of destination choices, such as: customer service, sales, product support, manufacturer's service representative. By selecting one of these dedicated destination icons, the customer activates the universal Internet based telephony system to automatically initiate an Internet telephony call to the identified destination while concurrently maintaining the customer's access to the present WEB page. The Internet telephony call that is originated from an affiliate WEB page is routed to an Internet telephony host, with the customer's login and password being forwarded as the customer billing data and the WEB server URL being forwarded to provide the Internet telephony host with data regarding the universal Internet based telephony system retailer (affiliate) who is assigned credit (pursuant to the retailer's affiliate agreement with Universal Internet based telephony system, Inc.) for the Internet telephony call initiation.

The universal Internet based telephony system can therefore be used to route customer inquiries to predefined destinations while the customer concurrently has access to the data provided by the WEB page, or the WEB page owner can become a universal Internet based telephony system affiliate and simply resell the universal Internet based telephony system that is provided by an Internet telephony server/network through the universal Internet based telephony system web page and related servers.

BRIEF DESCRIPTION OF THE DRAWING

FIG. 9 illustrates in flow diagram form a case where the universal Internet based telephony system 100 customer can maintain concurrent communication connections via the Internet to provide both data and voice connections.

DETAILED DESCRIPTION

Figure 1:
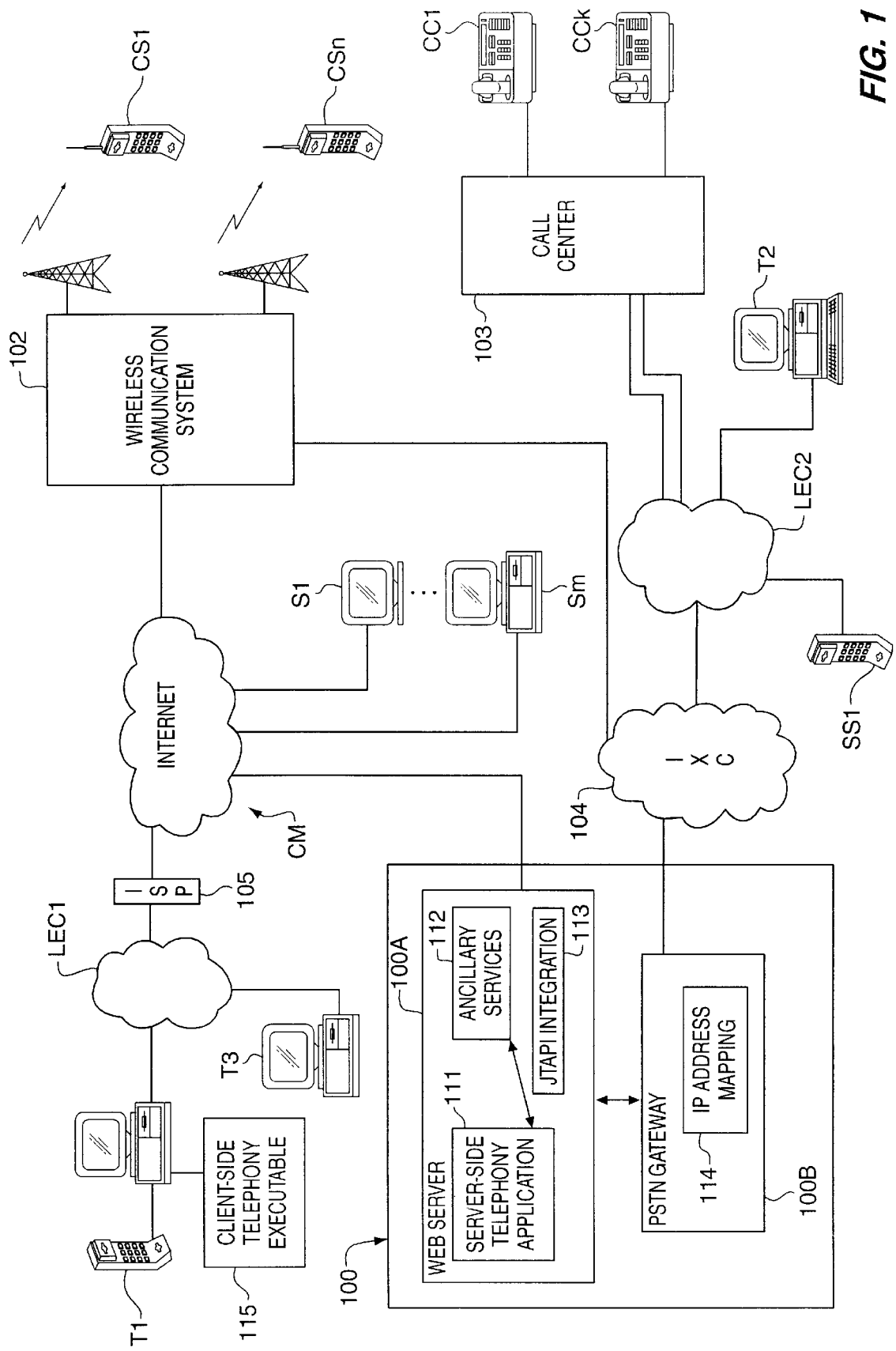
FIG. 1 illustrates in block diagram form the overall architecture of the present universal Internet based telephony system and a typical environment in which it is operational.

FIG. 1 illustrates in block diagram form the overall architecture of the present universal Internet based telephony system 100 and a typical communication network environment in which it is operational. The communication network environment illustrated in FIG. 1 includes communications networks LEC1, LEC2, which comprise a part of the Public Switched Telephone Network (PSTN) that serves a plurality of customer terminal devices T1, T2 (a personal computer, hand held computing device, cellular/wireless communication device, telephone station set or other data interface device, collectively termed "customer terminal devices" T1, T2 herein) and telephone station sets SS1, SS2. The operation of such a communications network is well known and is not described in detail herein. In addition, Internet CM (also termed "WEB" herein) is provided to exchange data communications among a plurality of WEB servers S1-Sm connected thereto. The operation of the Internet CM is well known and is not described in detail herein. Access to the Internet CM is provided in well known fashion to customers resident at customer terminal devices T1, T2 via Internet Service Providers 105 which interconnect communications networks LEC1, LEC2 with Internet CM. Thus, the customer at customer terminal device T1 accesses the Internet by activating the WEB browser process that is resident on customer terminal device T1 and initiating a modem connection from customer terminal device T1 through communications network LEC1 to Internet Service Provider 105. The Internet Service Provider 105 enables the customer to access Internet CM using the WEB browser process to gain access to the plurality of WEB servers S1-Sm (such as universal Internet based telephony system WEB server 100A) that are interconnected by the Internet CM. As part of the Internet access, the Internet Service Provider 105 that the customer contacts typically provides a display to the customer terminal device T1, which display is termed a WEB page, which is downloaded from the Internet Service Provider 105 to the customer terminal device T1.

Universal Internet Based Telephony System Architecture

This universal Internet based telephony system represents a paradigm shift from traditional client-focused application software products used in existing communication systems to a server-focused application service that includes a second layer of enhanced integrated services that provides features and benefits over existing communication service offerings. The suite of integrated applications and the customer's personal data contained in those applications are available to the customer from any browser-enabled terminal device, simply by logging into the Web site of the universal Internet based telephony system. This is accomplished by the low level programming of IP telephony protocol stacks, the interactive delivery of these protocol stacks from server to clients, server side applications that replace traditional client applications, a Web delivered graphical user interface, and server based customer data structures. The client application is a fraction of the size of existing IP telephony applications and the endpoints of a communication are identified in the service, not by IP address, which traditionally ties a calling party and a called party to a particular computing device. Instead of adding function to each client application, the server is updated and functions are downloaded to the client application as needed. In addition, the customer is identified by their login ID which is then mapped to the terminal device presently in use by the customer.

The architecture of the universal Internet based telephony system consists of seven logical components which are cooperatively operative on an IP backbone to deliver telephony enabled Web page to the customer's terminal device. These components include:

1. Client side terminal device telephony executable process 115
2. Server side telephony application process 111
3. Web server system 100A
4. Ancillary services processes 112
5. JTAPI integration system 113
6. PSTN Gateway system 100B
7. IP address to 10-digit PSTN mapping system 114

In operation, presently available IP telephony services require the customer to load an Internet telephony software package on the customer's personal computer in conjunction with establishing a billing account for this telephone service. This process executes on the customer's personal computer and enables the customer to access a specified and dedicated Internet telephony server to thereby obtain access to the Internet telephone service. The need to install Internet provider specific telephony software on the customer's personal computer represents an impediment to customers who access the Internet from various computers, since each personal computer used by the customer must be equipped with the same Internet provider specific telephony software. In addition, the existing dedicated Internet telephony software operates to the exclusion of other Internet access software, thereby failing to coordinate with other Internet accesses that the customer may wish to concurrently execute with the Internet telephony call. Thus, Internet telephony service represents an inexpensive alternative to standard long distance telephone service, but presents a number of constraints to the customer in order to obtain the benefits of low cost communications services.

The client side telephony executable process 115 illustrates the unique clientless nature of the universal Internet based telephony system 100. The present universal Internet based telephony system 100 includes a client side telephony executable process 115 that is interactively delivered to the memory resident Java Virtual Machine running on the customer's terminal device T1 via server side Java application processes 111.

The server side telephony application process 111 refers to application software running on the Web server system 100A of the universal Internet based telephony system 100 that delivers the telephony application to the customer's desktop, manages call routing, signaling, set up, tear down, and coordinates the activities of the other components contained in the universal Internet based telephony system 100.

The JTAPI integration system 113 consists of a system that is implemented using Java Telephony Applications Programming Interface (JTAPI) and comprises the development environment and tool set that is used by the universal Internet based telephony system 100 to integrate the server side telephony application process 111 with the ancillary services processes 112 that are provided in conjunction with the universal Internet based telephony system 100. The Java Telephony Applications Programming Interface system 113 is a portable, object-oriented application programming interface for Java based computer telephony applications.

Call Origination in the Universal Internet Based Telephony System

Figure 2:
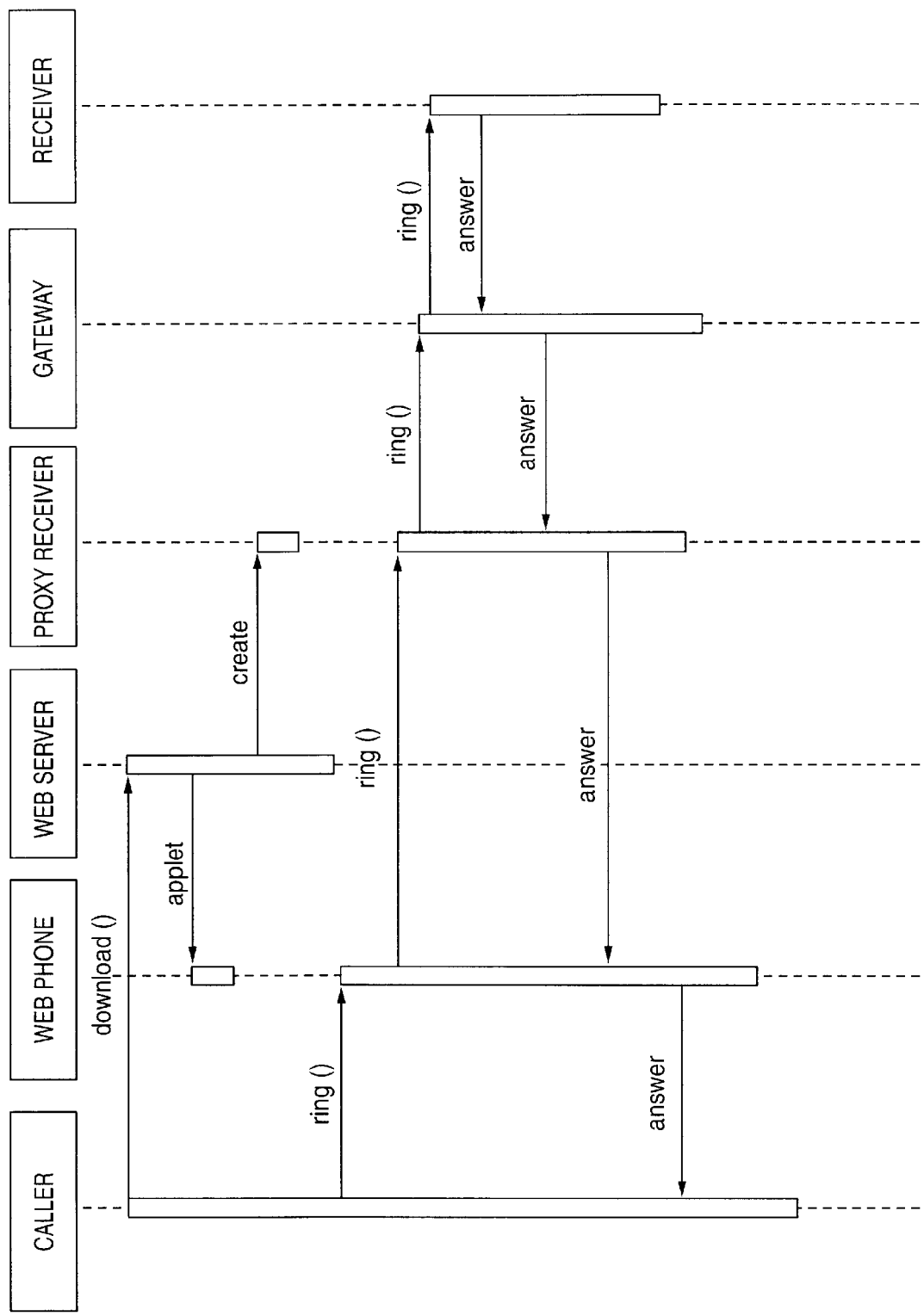
FIG. 2 illustrates the exchange of messages among the various elements that comprise the present universal Internet based telephony system.
Figure 3:
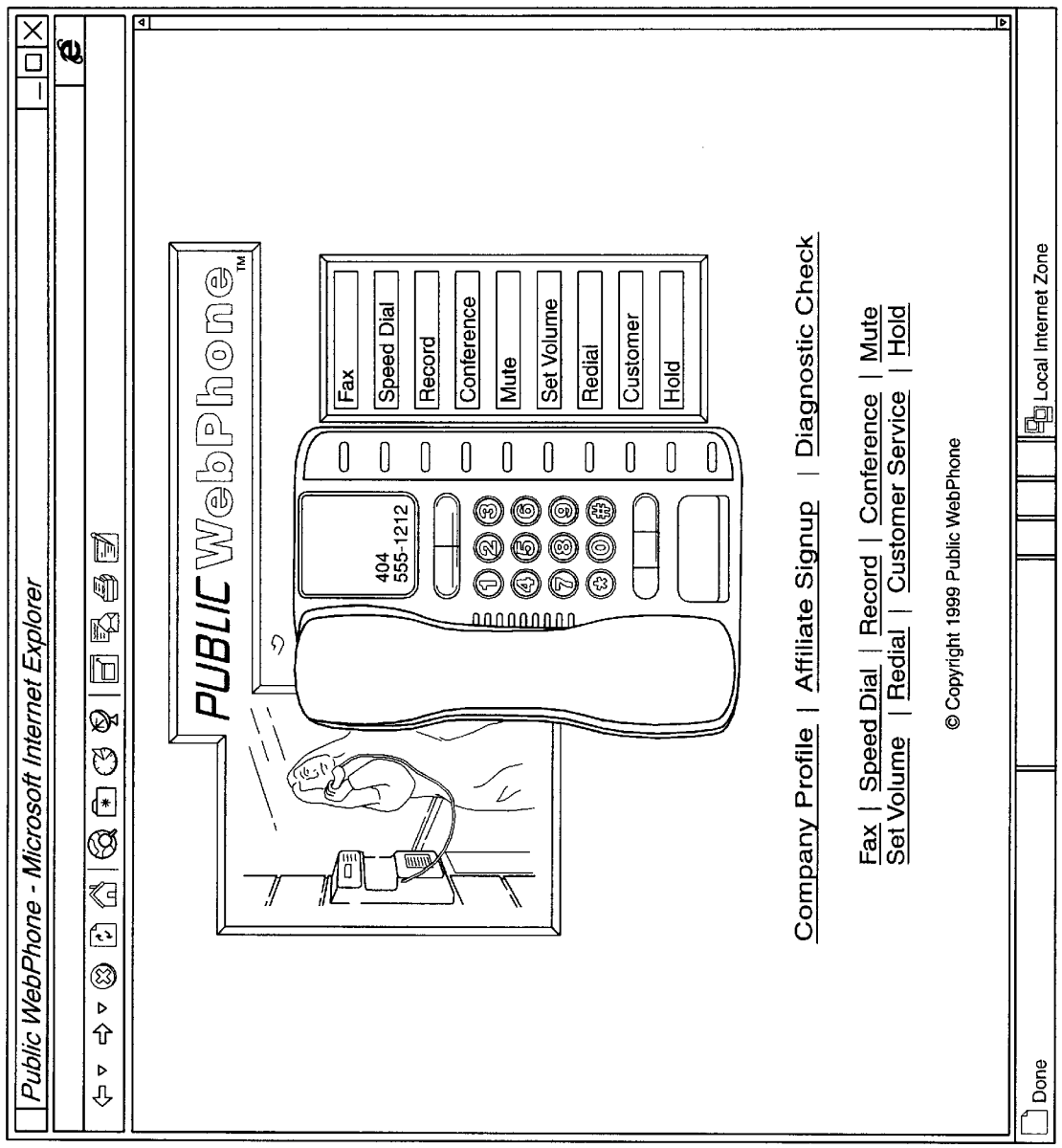
FIG. 3 illustrates a typical display that is produced by a WEB server to enable a user to access the present universal Internet based telephony system.
Figure 4:
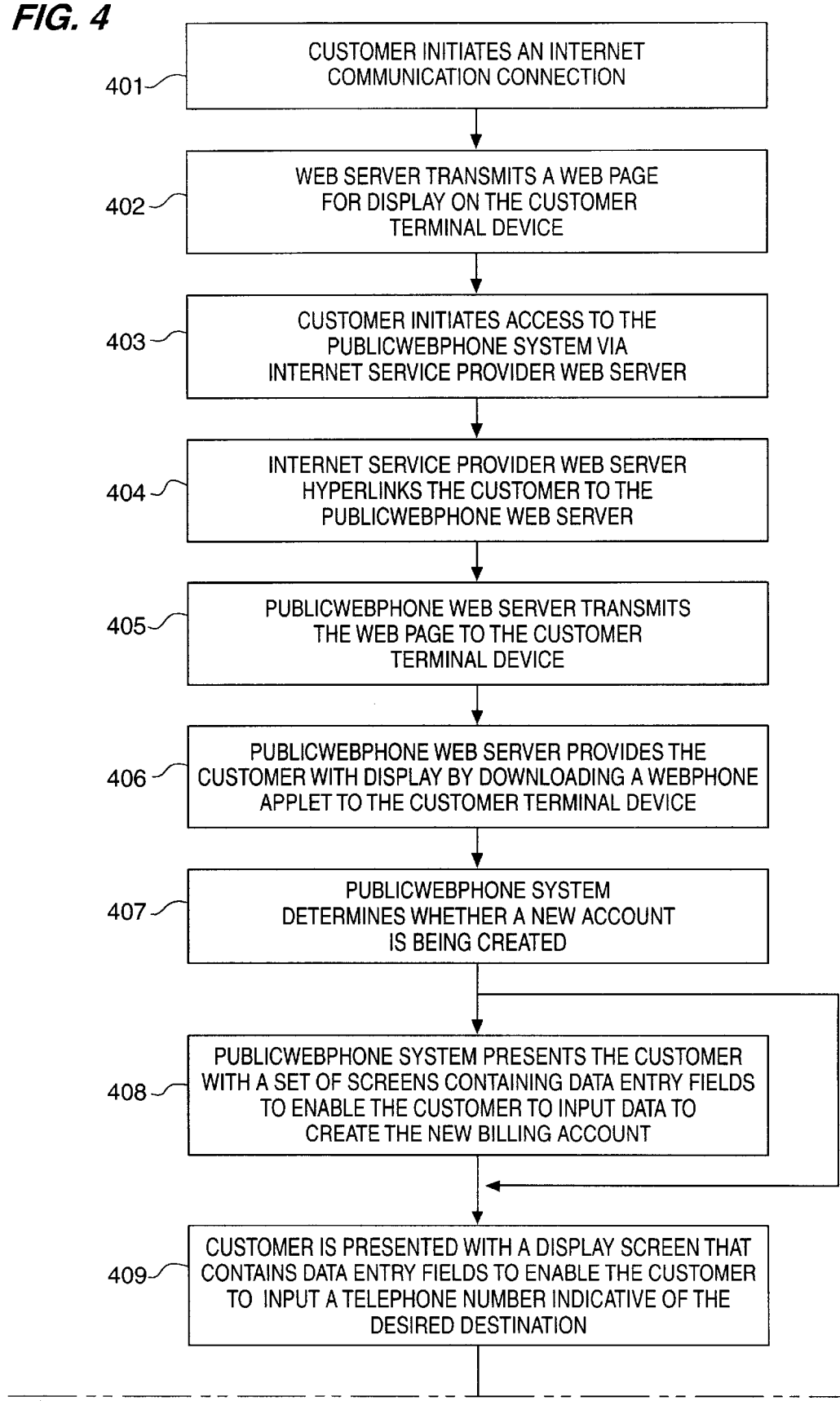
FIGS. 4 and 5 illustrate in flow diagram form the operational steps taken by the present universal Internet based telephony system to provide Internet telephone service to a customer in the instance of a call origination.
Figure 5:
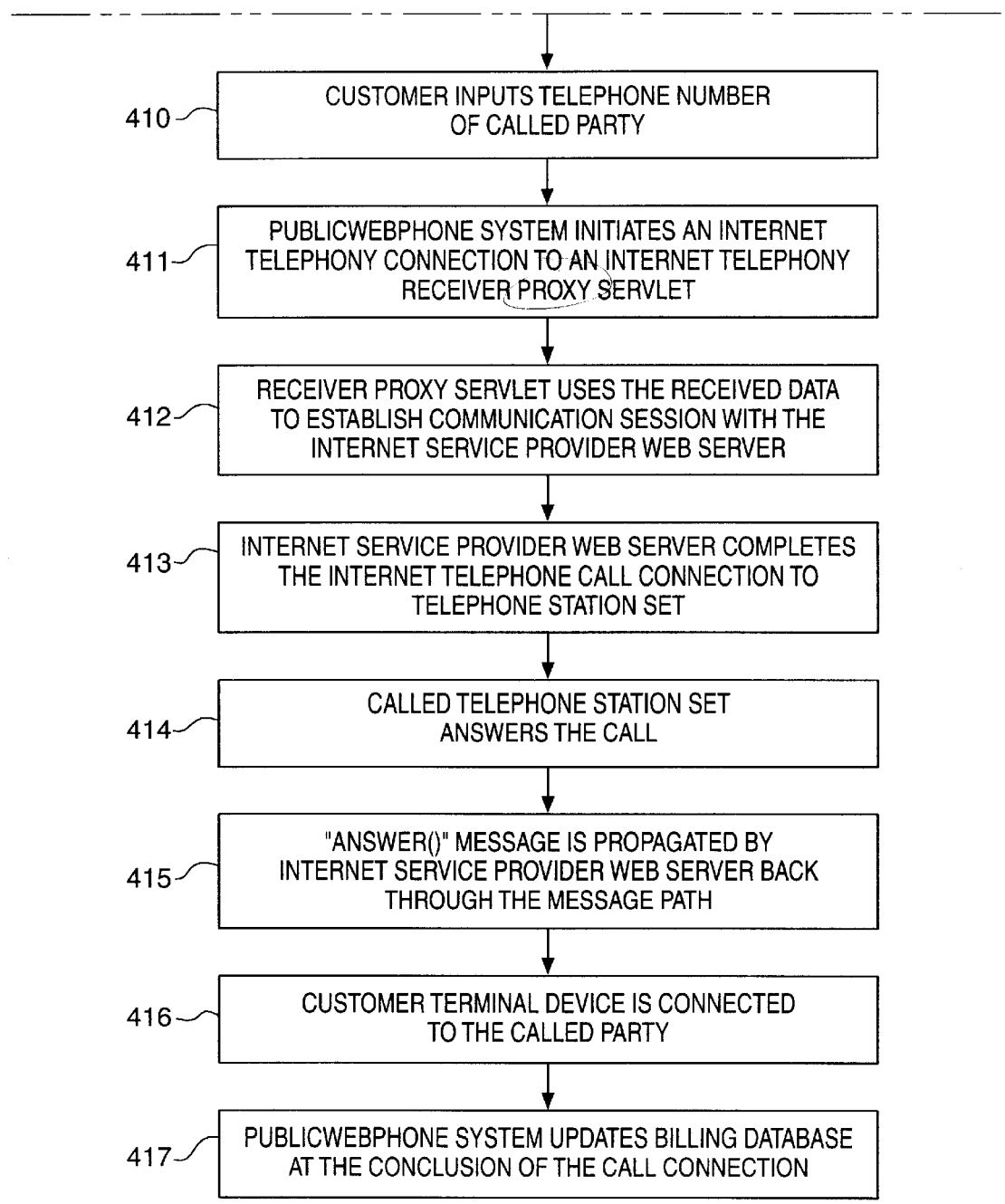

FIG. 2 illustrates the exchange of messages among the various elements that comprise the present universal Internet based telephony system 100 and the communications systems and devices illustrated in FIG. 1, FIG. 3 illustrates a typical display that is produced by a WEB server to enable a user to access the present universal Internet based telephony system 100 and FIGS. 4 and 5 illustrate in flow diagram form the operational steps taken by the present universal Internet based telephony system 100 to provide Internet telephone service to a customer in the instance of a call origination. The universal Internet based telephony system 100 typically resides on/includes an Internet WEB server, such as WEB server 100A, as the host. The customer's WEB browser is the proxy or pseudo-client and enables the customer to talk to an Internet Service Provider 105 via a set of communication scripts. These scripts are typically Java Enabled Internet Browser scripts resident on the customer's terminal device T1. The Internet Service Provider 105 can simply be equipped with a universal Internet based telephony system icon, associated display and hyperlink data that enables a customer who clicks on the displayed icon to be hyper linked to the universal Internet based telephony system 100. The universal Internet based telephony system 100 allows the customer to place telephone calls to a destination by using the customer's account name (login) and password via the WEB browser user interface that is executed on the customer's terminal device T1. The WEB page provided by the WEB server 100A to the customer terminal device T1 functions as a password protected user interface for the Internet telephony process.

The following description includes a description of the process whereby a customer establishes a customer universal Internet based telephony system account for Internet telephony, and also indicates how the customer initiates a universal Internet based telephony system Internet telephone call an existing universal Internet based telephony system account, from any terminal device.

The customer at step 401 initiates an Internet communication connection by activating the Java Enabled Internet Browser executing on the customer terminal device T1 to initiate a local telephone call via communications network LEC1 to the telephone access number of the customer's Internet Service Provider 105. This communication connection is via the Public Switched Telephone Network (PSTN) and serves to provide the customer with a physical connection from the customer's terminal device T1 to the Internet Service Provider 105. The WEB server of the Internet Service Provider 105 that is accessed in this manner transmits a WEB page for display on the customer terminal device T1 at step 402. As part of the WEB page, the Internet Service Provider 105 can display an icon indicative of the availability of universal Internet based telephony system 100 where the customer can initiate an Internet telephone call to any destination, or the icon can represent a predefined telephone number that automatically executes a script upon selection to initiate an Internet telephone call to a designated destination. Alternatively, the customer's terminal device T1 can be equipped with an icon which presents the universal Internet based telephony system to the customer as an accessible service option, and the customer can initiate the universal Internet based telephony system Internet access by simply clicking on this desktop icon for direct connection to the universal Internet based telephony system.

The customer at step 403 can initiate access to the universal Internet based telephony system 100 by inputting the URL of the universal Internet based telephony system WEB server 100A via the customer's WEB browser that is executing on the customer's terminal device T1 or by clicking on the displayed universal Internet based telephony system icon which is presented by the WEB page of the Internet Service Provider 105 to which the customer is connected. The Internet Service Provider 105 at step 404 hyperlink the customer to the universal Internet based telephony system WEB server 100A when the customer clicks on the displayed icon, which actions transmit a "download( )" message to the WEB phone system 100, and at step 405 the universal Internet based telephony system WEB server 100A transmits the WEB page of FIG. 3 to the customer terminal device T1. The universal Internet based telephony system WEB server 100A at step 406 provides the customer with a display by downloading an IP phone applet to the customer terminal device T1 that executes the customer terminal device portion of the universal Internet based telephony system 100 and enables the customer to either establish a new account with the universal Internet based telephony system 100 or use an existing account. The applet includes the signaling media streaming and media control specific to the microphone and speaker API of the specific customer terminal device T1 through a server side query of the customer terminal device T1. The page can be one page containing a graphic representation of a telephone and two click through links. The first click through reads "If you already have an account click here." This prompts the user for their account number and allows passage to an active Telephone Java Script where they can click on the numbers to dial and thus invoke HTML which places the telephone call. The phone has a volume button and a clarity button. The second link reads "Set up an account with universal Internet based telephony system". This secure script prompts the user for their new account information and allows the user to choose from a menu of payment methods including secure credit card or bill the customer directly through their current service provider. Once submitted, the user has an immediate response as to acceptance of the credit card and/or whether their service provider currently has a billing arrangement with Universal Internet based telephony system.

At step 407, the universal Internet based telephony system 100 determines, pursuant to the customer's data input via customer terminal device T1 whether a new account is being created. If the customer elects to establish a new account, processing advances to step 408 where the universal Internet based telephony system 100 presents the customer with a set of screens containing data entry fields to enable the customer to input the customer specific data and billing information, in well known fashion, that is necessary to create the new billing account. The customer is provided with a 10-digit virtual telephone number to enable the customer to access this service from anywhere. Once the customer information is received and validated, processing advances to step 409 where the customer is presented with a display screen that contains data entry fields to enable the customer to input a telephone number indicative of the desired destination at step 410. The user interface for the address book is not part of the applet but rather resides on the server and is accessible via the Web page. The call is placed through an interaction between the applet (media control, media streaming) to the Web Gateway and signaling at the same time between applet's user agent (signaling) and the SIP location server, which operate together piece the call back together for the called party.

At step 411, the keystrokes input by the customer are used by the universal Internet based telephony system 100 to initiate an Internet telephony connection by forwarding the received data ("create" in FIG. 2) to an Internet Telephony Receiver Proxy Servlet 142, along with the customer's login and password identity. In the case of a predetermined destination being represented by the selected icon, the step of customer input of a telephone number is bypassed, since the WEB server 105 already has the destination telephone number data. The WEB server 100A includes the URL of WEB server 105 to enable the Receiver Proxy Servlet 142 to credit the WEB server 105 with being the source of the Internet telephony call. The Receiver Proxy Servlet 142 at step 412 uses the received data to establish a communication session with the Internet Service Provider WEB server 105 located proximate to the destination terminal device T2 or telephone station set SS1. The Internet Service Provider WEB server 135 completes the Internet telephone call connection at step 413 by extending the call connection ("ring( )" of FIG. 2) to telephone station set (for example) SS1 via the communications network 102. When the called telephone station set SS1 answers the call at step 414, an "answer( )" message is propagated by Internet Service Provider WEB server 135 at step 415 back through the message path illustrated in FIG. 2 and the customer at customer terminal device T1 is connected at step 416 to the called party ("Receiver") located at telephone station set SS1 to enable the two parties to communicate in a telephone communication session via the Internet 103 and the communications network 101, 102. The universal Internet based telephony system 100 chronicles each Internet telephone call, including the source WEB page, call duration, call destination and this data is used to update a billing database 145 at step 417 at the conclusion of the call connection. The billing can be via pre-established customer account, credit card, associated telephone number, associated Internet user identification, and the like.

This system architecture is Fat Host/Thin Client in that the universal Internet based telephony system software allows the customer to remotely operate the universal Internet based telephony system 100 with the WEB page provided by the WEB server 100A functioning as the user interface. As a speed enhancement in this process, when the customer browses to the WEB server 100A, the WEB page is downloaded to the customer's terminal device T1 and cached for future speed enhancement without direction from the customer. Thus, any terminal device, such as a personal computer, with a multimedia package that includes a microphone and speakers, can function as a telephone without the user having to download any software.

Personal Computer to Personal Computer

Figure 6:
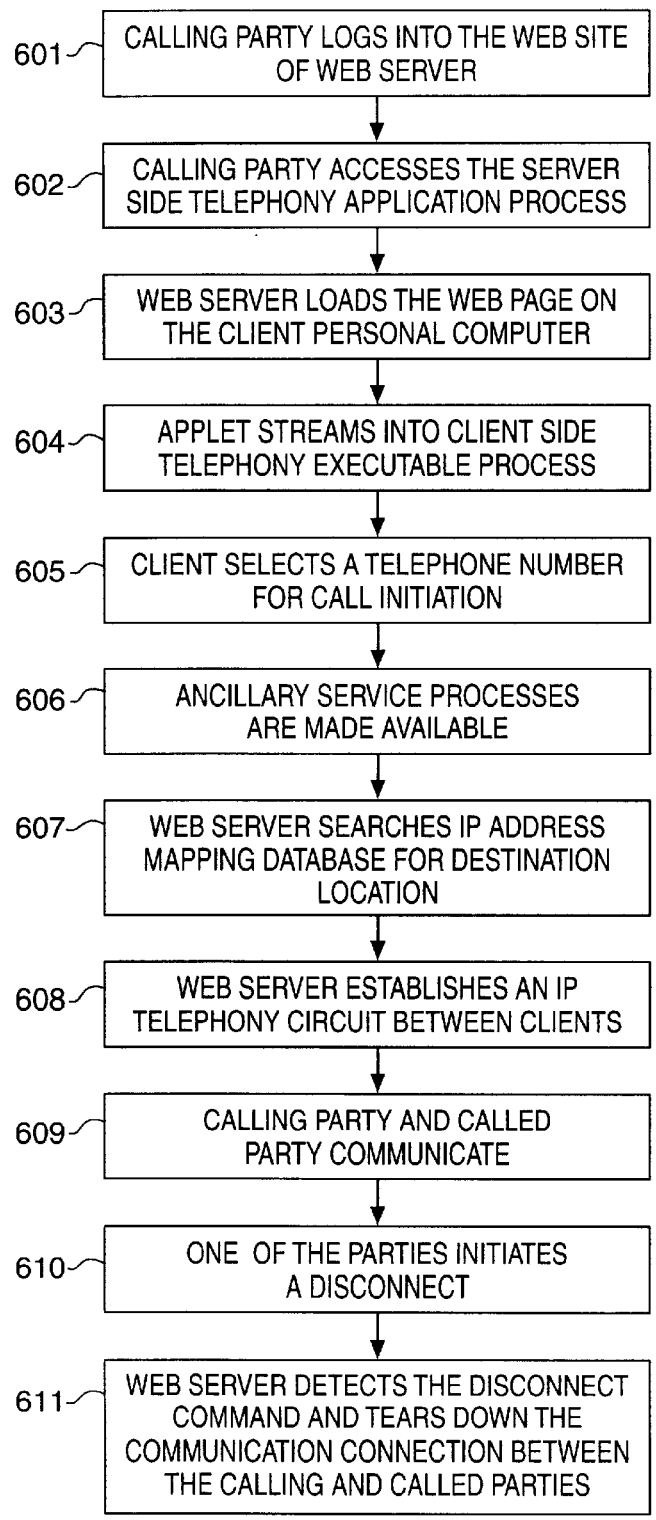
FIG. 6 illustrates in flow diagram form the process flow that occurs when a calling party logs into the Web site and initiates a call to another user who is also logged into the Web site.

The universal Internet based telephony system 100 can be used for processing communications connections that are Personal Computer to Personal Computer. FIG. 6 illustrates in flow diagram form the process flow that occurs when a calling party at customer terminal device T1 logs into the Web site of Web server 100A and initiates a call to a called party at customer terminal device T3 who is also logged into the Web site of Web server 100A. At step 601, the calling party at customer terminal device T1 logs into the Web site of Web server 100A, as described above with respect to FIG. 4, to access the Web server 100A and the server side telephony application process 111 that executes thereon at step 602. The Web server 100A loads the Web page on the client personal computer T1 at step 603. The telephony application (applet) streams into the client side telephony executable process 115 located in the memory of the customer terminal device T1 at step 604 and the client selects a telephone number for call initiation at step 605. Since the called party is also logged into the Web site of Web server 100A via customer terminal device T3 and is a subscriber to the IP telephony service, the called party has been assigned a virtual telephone number of 10-digits and can be accessed via this 10-digit virtual telephone number. Therefore, the calling party can input this virtual 10-digit telephone number into the Web site 100A to initiate a call connection to the called party, regardless of where the called party is located. In addition, the ancillary service processes 112 related to the customer's selection are made available at step 606. The Web server 100A at step 607 searches the IP address mapping database 114 for the destination location and if available, the Web server 100A establishes an IP telephony circuit between clients, located at customer terminal devices T1 and T3, via the Internet CM at step 608. The calling party and called party communicate at step 609 and when the call is over, one of the parties initiates a disconnect at step 610. The Web server 100A detects the disconnect command and tears down the communication connection between the calling and called parties at step 611.

Personal Computer to Telephone Station Set

Figure 7:
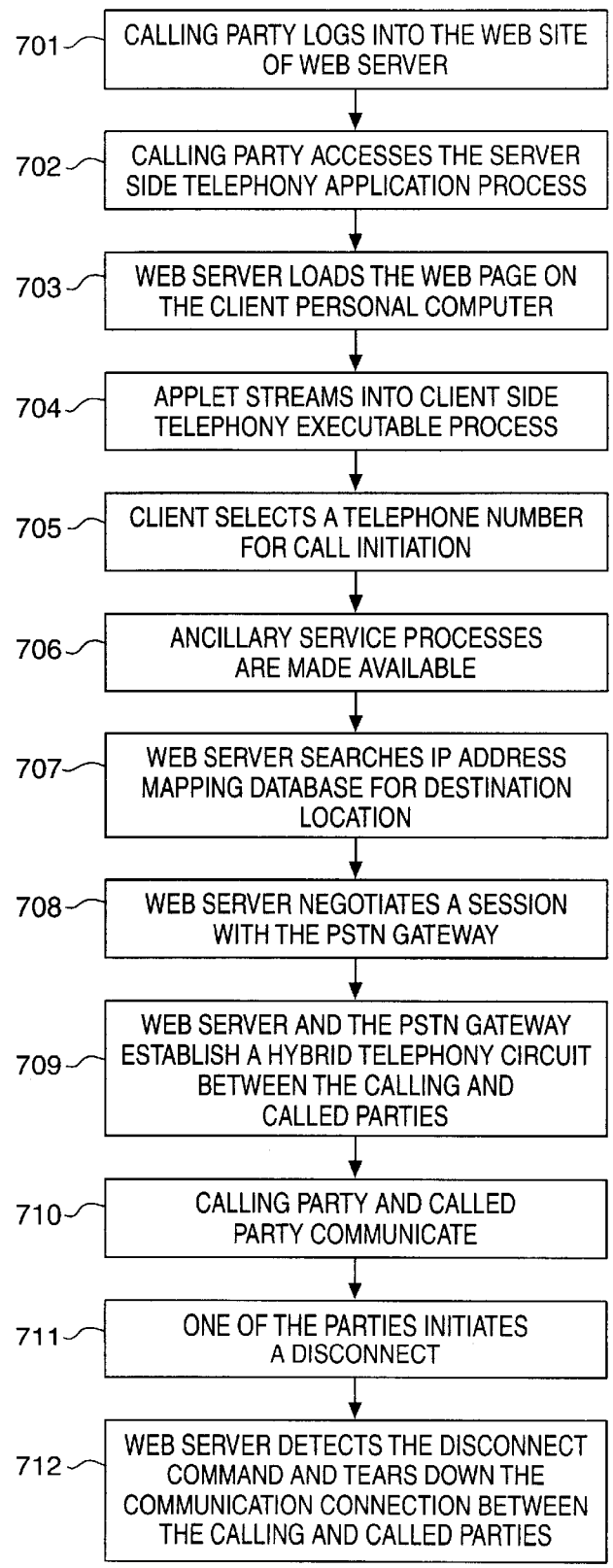
FIG. 7 illustrates in flow diagram form the process flow that occurs when a calling party logs into the Web site and initiates a call to another user who is available via a telephone station set addressable at a traditional 10-digit telephone number.

The universal Internet based telephony system 100 can be used for processing communications connections that are Personal Computer to Telephone Station Set. FIG. 7 illustrates in flow diagram form the process flow that occurs when a calling party logs into the Web site of Web server 100A and initiates a call to a called party who is available via a telephone station set SS1 addressable at a traditional 10-digit telephone number. The calling party located at customer terminal device T1 logs into the Web site of Web server 100A at step 701, as described above with respect to FIG. 4, to access the Web server 100A and the server side telephony application process 111 that executes thereon at step 702. The Web server 100A loads the Web page on the client personal computer T1 at step 703. The telephony application (applet) streams into the client side telephony executable process 115 located in the memory of the customer personal computer T1 at step 704 and the client selects a telephone number for call initiation at step 705. In addition, the ancillary service processes 112 related to the customer's selection are made available at step 706. The Web server 100A at step 707 searches the IP address mapping database 114 for the destination location that is defined by the 10-digit telephone number. Since the destination is a traditional telephone station set, the Web Server 100A negotiates a session with the PSTN Gateway 100B at step 708. If a communication path is available, the Web server 100A and the PSTN Gateway 100B establish a hybrid telephony circuit between the calling and called parties at step 709. The calling party and called party communicate over this hybrid telephony circuit at step 710 and when the call is over, one of the parties initiates a disconnect at step 711. The Web server 100A and/or the PSTN Gateway 100B detect the disconnect command and tear down the communication connection between the calling and called parties at step 712.

Telephone Station Set to Personal Computer

Figure 8:
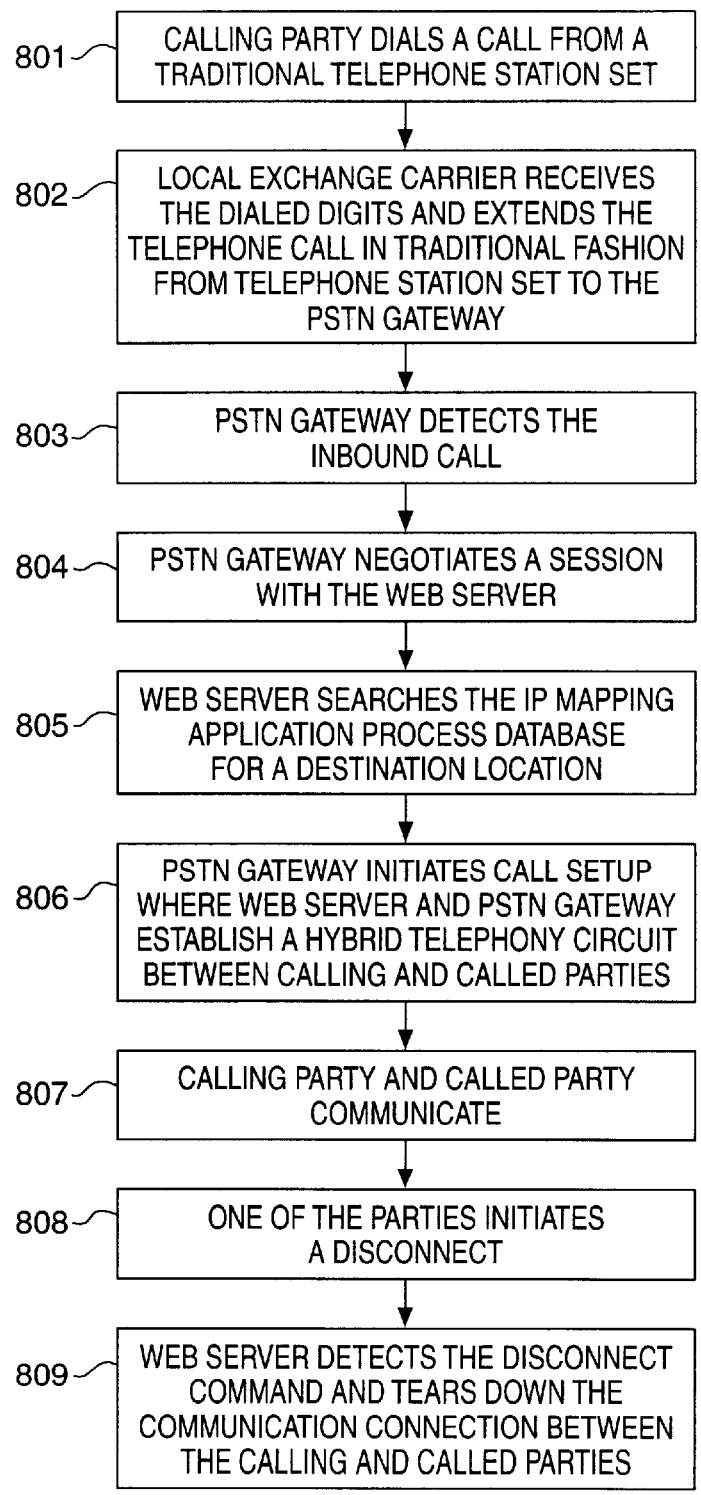
FIG. 8 illustrates in flow diagram form the process flow that occurs when a calling party dials a call from a traditional telephone station set assigned a 10-digit telephone number to a personal computer.

The universal Internet based telephony system 100 can be used for processing communications connections that are Telephone Station Set to Personal Computer. FIG. 8 illustrates in flow diagram form the process flow that occurs when a calling party dials a call at step 801 from a traditional telephone station set SS1, which is assigned a 10-digit telephone number, to a personal computer T1 that is served by the universal Internet based telephony system 100. The local exchange carrier LEC2 at step 802 receives the dialed digits and extends the telephone call in traditional fashion from telephone station set SS1 to the PSTN Gateway 100B via the switching network of the local exchange carrier LEC2 and the inter-exchange carrier 104. At step 803, the PSTN Gateway 100B detects the inbound call. The PSTN Gateway 100B, at step 804, negotiates a session with the Web server 100A, which searches the IP mapping application process database 114 at step 805 for a destination location. The PSTN Gateway 100B signals busy or initiates a call setup at step 806 if a communication path is available, where the Web server 100A and the PSTN Gateway 100B establish a hybrid telephony circuit between the calling and called parties. The calling party and called party communicate at step 807 and when the call is over, one of the parties initiates a disconnect at step 808. The Web server 100A and/or the PSTN Gateway 100B detect the disconnect command and tear down the communication connection between the calling and called parties at step 809.

Call Center

FIG. 9 illustrates in flow diagram form a case where the universal Internet based telephony system 100 customer can maintain concurrent communication connections via the Internet to provide both data and voice connections. For example, at step 901, the calling party at customer terminal device T1 logs into the Web site of Web server S1 to access product/services information that is provided by the vendor to customers via Web Server S1. The Web server S1 loads the Web site home page on the client personal computer T1 at step 902. The customer can browse the Web site of the Server S1 to obtain information, in well known manner, at step 903 and the customer can initiate a telephone call to a vendor service representative via the universal Internet based telephony system 100 at step 904 by clicking on an icon presented by the Web server S1 on one of its web pages. The icon typically denotes a one of a plurality of possible destinations to which the customer can be linked and in this example, the icon represents the vendor's customer service representatives, who are available via call center 104.

The calling party located at customer terminal device T1 by clicking on the icon at step 904, logs into the Web site of Web server 100A at step 905, as described above with respect to FIG. 4, to access the Web server 100A and the server side telephony application process 111 that executes thereon at step 906. The telephony application (applet) streams into the client side telephony executable process 115 located in the memory of the customer personal computer T1 at step 907. The ancillary service processes 112 related to the icon activation automatically loads the 10-digit telephone number of the call center 104 that serves the customer service representatives, located at telephone station sets CC1-CCk, at step 908. The Web server 100A at step 909 searches the IP address mapping database 114 for the destination location that is defined by the 10-digit telephone number. Since the destination is a call center 103 serving a plurality of traditional telephone station sets CC1-CCk, the Web Server 100A negotiates a session with the PSTN Gateway 100B at step 910. If a communication path is available, the Web server 100A and the PSTN Gateway 100B establish a hybrid telephony circuit between the calling party and call center 104 at step 911. The call center 104 at step 912 interconnects the incoming call from the customer at customer terminal device T1 to a selected service representative located at telephone station set CC1 and the calling party and service representative communicate over this hybrid telephony circuit at step 913 and when the call is over, one of the parties initiates a disconnect at step 914. The Web server 100A and/or the PSTN Gateway 100B detect the disconnect command and tear down the communication connection between the calling and called parties at step 915.

Cellular/Wireless Communications

The universal Internet based telephony system 100 can be used to serve calls to and from cellular/wireless subscriber stations CS1-CSn (collectively termed "mobile subscriber stations" herein to reflect the fact that these stations are not tethered via wires to the telephone switching network). In particular, the mobile subscriber station CS1 can be used by the customer to initiate an IP telephony call to a called party located at a customer terminal device T1 as described above with respect to FIG. 8. In this case, the mobile subscriber station CS1 is connected via wireless communication system 102 and Inter-Exchange Carrier system 104 to the PSTN Gateway 100B, in a manner that is analogous to the telephone station set SS1 being connected to the PSTN Gateway 100B via Local Exchange Carrier system LEC2 and the Inter-Exchange Carrier system 104. Similarly, IP telephony calls originated by a calling party located at the customer terminal device T1 can be initiated to a called party located at mobile subscriber station CS1 in a manner that corresponds to that described with regard to FIG. 7.

Implementation Architecture

The architecture of the universal Internet based telephony system 100 is a distributed object architecture which makes the execution location of an application subsystem transparent to the application, because multiple objects form a single executing application divided as necessary between computing platforms. Thus, distributed object computing extends an object-oriented programming system by allowing objects to be distributed across a heterogeneous network, so that each of these distributes object components interoperate as a unified whole. These objects may be distributed on different computers throughout a network, living within their own address space outside of an application, and yet appear as though they were local to an application. Thus, a centralized object broker interconnects each IP telephony object with other telephony objects, which are located either locally or remotely. Each object has an interface and exposes a set of methods. A client device can make method calls on an object reference as if the server object resided in the client's address space. The object request broker is responsible for finding an object's implementation, preparing it to receive requests, communicate requests to it and carry the reply back to the client device. Thus, diverse operating system platforms can intercommunicate.

As an example, a client makes a call to the client proxy and the client side proxy packs the call parameters into a request message and invokes a wire protocol to ship the message to the server. At the server side, the wire protocol delivers the message to the server side stub. The server side stub then unpacks the message and calls the actual method on the object. The client stub is called the stub or proxy and the server stub is called skeleton. The client stub is referenced to as proxy and the server stub is referred to as stub. The telephony protocol stack resident in server side telephony application process 111 can be implemented using the SIP protocol which is an IETF standard protocol for IP communication, for enabling IP telephony gateways, client endpoints, private branch exchanges, and other communication systems or devices to communicate with each other. The SIP protocol mainly addresses the call setup and tear down mechanisms of sessions and is independent of the transmission of media streams between the calling and called parties.

Dynamic Streaming Lossless Compression

The universal Internet based telephony system 100 uses a CODEC that performs real time on the fly compression and decompression for voice over IP telephony applications. 32 bit lossless voice compression converts 64 KB PCM to 16 KB and back again to 64 KB PCM uses bit streaming. In the universal Internet based telephony system 100, the client side telephony executable process 115 and the server side telephony process 111 cooperate in selecting the size of the buffer that is allocated to compression. The universal Internet based telephony system 100 can automatically modify the compression rate on the fly or the user can select a compression rate.

Additional Services

There are many services to be offered over the Internet telephony connection provided by the universal Internet based telephony system 100, these are just a few:

Calling Cards—A full suite of enhanced feature calling cards can be used, including some with voice over Internet technology.

Fax over IP Corporate—A special service custom tailored for small and medium sized business to enable companies to take advantage of cost reductions associated with Internet technology for their fax to fax communications.

Fax over IP Broadcasting—Immediate fax over IP broadcast marketing services.

IP Telephony LD cards—Pre-paid IP telephony cards over the net allow any user, at any time to dial from any phone into the network with their customer ID and place calls to anywhere in the developed world across the IP telephony network of the universal Internet based telephony system 100.

800 Follow Me Service—The one 10-digit virtual telephone number of the universal Internet based telephony system 100 enables a calling party to locate the customer, regardless of their location.

1+Inbound Service—You are able to take advantage of the latest communication technologies without dialing extra digits.

800 Inbound—Customers are able to have an 800 number routed to any number worldwide, through pre-existing PSTN to IP network interfaces.

Audio and Video Conferencing—This new marriage of IP to PSTN brings in the generation of the IP video board meeting. Anyone, anywhere with a computer is able to remotely attend shareholders meetings, conferences and training seminars with significant travel savings and salient convenience.

Sales of Banner Ad's on this Portal Site—Advertising revenue generated from this high traffic portal site can be in the millions. The possibilities for services to provide over IP-telephony networks can only be limited by the limitations of the entrepreneur's imagination.

Remote Control of Acoustic Echo Suppression for Internet Telephony

In Internet telephony applications, the microphone and speakers of the customer terminal device T1 function as a telephone handset. If there is no headset on the customer terminal device T1, just speakers, the audio output of the speakers can be picked up by the microphone, creating an acoustic echo. This acoustic echo is transmitted to the party at the other end of the communication connection as a delayed echo of their voice. The acoustic echo is not heard by the customer at their customer terminal device T1 and the customer is therefore unaware of the presence and severity of the acoustic echo. The acoustic echo makes it difficult to conduct a normal conversation and degrades the value of voice over Internet protocol applications that rely on multimedia PCS.

Acoustic echo can be corrected in two ways: by echo suppression (which disables the microphone when voice is being delivered through the speakers), or by echo cancellation (in which signal processing software "subtracts" the sound picked up from the speakers from the sound relayed from the microphone to the listener). Either method of correcting acoustic echo has shortcomings. Echo suppression methods typically create a half duplex connection, in which only one party can speak at a time. While preferable to the echo, a half duplex connection can seem choppy and is less desirable than a full duplex connection. One the other hand, echo cancellation is processor intensive and is particularly difficult in Internet telephony where both network latency and the acoustic configuration of the connecting PCS are variable.

Use of Tone Signals to Control Acoustic Echo Suppression or Cancellation Features In the case when the customer hearing acoustic echo is using a telephone SS1, cellular telephone CS1, or similar telephony device that is equipped with a touchtone keypad, and an acoustic echo is perceived, the customer may transmit a sequence of tone signals to the Voice over IP gateway 100A through which the call is routed. These tones are generated by use of the keypad of the customer terminal device SS1 and the keypad button pushes are translated into digital commands and inserted into IP packets for transmission to the multimedia customer terminal device T1 at the other end of the connection. (The Voice over IP gateway 100A is programmed to recognize these keypad sequences and translate them into commands; it does not pass on an audible signal as part of the media stream.) The voice over IP application 115 resident on the multimedia customer terminal device T1 responds to the digital commands by turning on its echo suppression or echo cancellation features. For example, the Voice over IP application 115 may enable an echo suppression subroutine that converts the voice connection from full duplex to half duplex. Alternatively, the Voice over IP application 115 may invoke an echo cancellation subroutine that attempts to cancel the acoustic echo by subtracting the sound delivered from the speakers to the microphone of the customer terminal device T1 from the voice stream picked up by the microphone.

Tone signals could also be used to turn off echo suppression or echo cancellation features. For some applications, it may be preferable for echo suppression or echo cancellation if it is confirmed that the caller is using a headset.

Computer-Based User Controls for Remote Control of Acoustic Echo Suppression or Cancellation Features In the case where a customer experiences an acoustic echo problem and is using a multimedia customer terminal device T2, such as a personal computer or other computing device, to provide their voice connection and an acoustic echo is perceived, the customer may access a set of on-screen controls to adjust the echo suppression or echo cancellation settings of the Voice over IP application 115 on the multimedia customer terminal device T1 at the other end of the connection. Graphically, the control may be buttons, icons, sliders, or other familiar visual devices provided through a graphical user interface. The changes made to the acoustic echo controls are translated into digital parameter settings and conveyed to the multimedia customer terminal device T1 at the other end of the connection within IP packets. The Voice over IP application 115 on the multimedia customer terminal device T1 responds by enabling, disabling, or adjusting its echo suppression or echo cancellation features as outlined in the previous section.

Remotely Controlling the Display of Web Pages Using a Telephone

Companies with call centers 103 may receive Voice over IP calls from customers of their web sites, creating a situation in which it is desirable to interactively "push" web pages out to the remote customer. For call centers 103 that are not equipped to provide agents with multimedia customer terminal devices or to support collaborative browsing applications, the following application enables the call center customer service representative or other user to "push" web pages out to remote customers by using their telephone keypad or an equivalent telephony device.

Controlling Remote Display of Web Pages Uses Dial Pad Sequences

The call center agent can "push" web pages through a browser-resident Voice over IP or other application using dial pad sequences on their telephone CC1 or similar telephony device. To make this process work, the agent is provided with a list of dial page command sequences (e.g., *76, equivalent to pressing the star key and the seven and six digit keys) with corresponding web page URLs) typically in printed form. When the dialpad sequences are dialed by the call center agent on their telephone station set CC1, the dial tone sequence is interpreted by the Voice over IP gateway 100A as commands and translated into command sequences embedded within IP packets sent to a web server that would serve up the corresponding web page to the destination multimedia customer terminal device T1 at the far end of the communication connection.

Remotely Controlling Media Settings in Conjunction with Voice Over IP or Multimedia Over IP Communications For some Voice over IP applications, a user's multimedia customer terminal device T1 is used as a telephone terminal device. The quality of sound experienced by the person at the other end of the connection is affected by media control settings on the originating multimedia customer terminal device T1. In many cases, multimedia customer terminal device T1 customers are not aware of these controls or their placement within the operating system of the multimedia customer terminal device T1. The following system allows a person receiving a Voice over IP call, such as a call center agent, to remotely control the media settings on the caller's multimedia customer terminal device T1 functioning as a telephone terminal device.

Remotely Controlling Media Settings Using Computer-Displayed Controls

The person experiencing a voice quality problem, if the voice connection is provided through a multimedia customer terminal device T2, may control the media settings on the multimedia customer terminal device T1 through a set of controls that interacts with the Voice over IP application 115 resident on the remote multimedia customer terminal device T1. Examples of the settings that could be manipulated are microphone volume, speaker volume, an multimedia device settings. These controls could be test-based, or may be implemented as graphical devices such as sliders, buttons, or icons.

To make this process work, the Voice over IP or multimedia communications application 115 resident on the remote multimedia customer terminal device T1 must include a facility for receiving setting changes embedded within Internet packets. The application would recognize the setting changes and translate them into commands for the media controls within the operating system of the multimedia customer terminal device T1. (Various connection methods could be used, such as a browser-resident applet that translates the setting changes into remote procedure calls to the Windows operating system on the multimedia customer terminal device T1).

Remotely Controlling Media Settings Using Telephone Dialpad Sequences

If the customer experiencing a voice quality problem is using a telephone SS1 with a dialpad or other similar device to participate in a Voice over IP call, the customer can remotely change the media control settings on the remote multimedia customer terminal device T1 by transmitting dialtone sequences using the touchtone dialpad. Various dialtone sequences would represent different commands (e.g., *22 could mean increase volume by 20% decibels; *88 could mean reduce volume by 20%).

To make this process work, the Voice over IP gateway 100A must be equipped to recognize the dialtone sequences as commands, convert them to digital commands embedded within IP packets, and pass them through to the multimedia customer terminal device T1 at the other end of the voice connection. Similarly, the Voice over IP application 115 on the multimedia customer terminal device T1 must be prepared to recognize the commands and translate them into remote procedure calls to the multimedia customer terminal device operating system to make changes to the media control settings.

Displaying Data Correlated to a Customer's Access to Web Pages via Conventional Telephony without a Direct Web-Based Connection For some Voice over IP applications in eCommerce, a customer's multimedia customer terminal device T1 is used as telephone terminal device to make contact with a customer call center 103 or contact center. Many call centers 103 are not equipped for Internet telephony and therefore receive these calls using the Public Switched Telephone Network (PSTN), of which local exchange carrier LEC1 is a part. These call centers 103 use sophisticated call management and customer relationship management systems that display key information about the customer relationship management systems that display key information about the customer's history, buying preferences, and purchasing behavior that depends on customer identifying information (such as account numbers) or the customer's phone numbers (which is often identified by a caller identification feature using the ANI standard employed in the PSTN). One of the perceived shortcomings of Internet telephony when a multimedia customer terminal device T1 is used as a customer's telephone terminal device is that customer information may not be available to the call center 103 or contact center agent unless the agent is equipped with a PC-based telephone device that can display the same web content the customer is viewing, and/or related customer relationship management data.

The present system addresses a way to deliver information about the customer's access to web pages and customer history data, collected through an application resident on the customer's multimedia customer terminal device T1, drawing upon features built into Web browsers. The information that can be delivered includes any customer identifying information stored in cookies, as well as web pages the customer is currently accessing or has recently accessed along with the contents of selected Web-based forms the customer has complete. All the information can be converged to the call center's customer relationship management system using only ANI caller identification data provided automatically by the Internet-to-PSTN gateway employed to provide Voice over Internet service, which can then be correlated with other information delivered through the Internet CM to the customer relationship management system.

Providing Customer Data for CRM Purposes Using ANI Information Delivered by Conventional Telephone For a call center 103 that has only a conventional telephonic connection to receive an incoming Voice over IP call delivered via a customer's web browser, the gateway-supplied ANI caller identification number is used as a key to tie the call to a particular user session on the Web. For example, a customer accessing an airline's web site might "click to call" and establish a connection to a call center agent who uses a mainframe-based 3270 terminal or a client/server multimedia customer terminal device without a web browser to book reservations. The ANI caller identification number is associated with the PSTN gateway, not the customer's own telephone. However, the customer information can be supplied through a web server than establishes the correlation between a customer session on the airline's web page, any customer information stored on the customer's multimedia customer terminal device T1 (such as cookies), any information maintained on the airline's or third party web servers, and the phone connection established by the customer using the Voice over IP service.

To make this process work, the Voice over IP service must maintain a database that links each active telephone session, in near real-time, to the originating multimedia customer terminal device T1 as identified by a URL or IP address. A web server linked to this database can upload information from the customer's web browser (including cookies and referring web page). The browser-based information, for example, might identify the multimedia customer terminal device T1 as possibly belonging to a customer with a frequent flyer membership that entitles the customer to a specific class of service. It might also indicate that the customer is currently looking at the airline's special offer for vacation packages in Aruba. This information, along with session history information collected from the airline's own web server, can be posted to database system accessible to the airline's customer relationship management system.

Using a set of application programming interfaces, the airlines' customer relationship management system could determine that the call was originating from a Voice over IP service (by looking up the ANI caller identification number which is linked to the PSTN gateway) and check the Voice over IP service's call posting database to collect the available customer data. This data could be secured by only permitting the airline, for example, to access data from call sessions that were initiated from their own web pages.

This process could be combined with the process described for "pushing" web pages back to the customer browser to simulated a collaborative browsing experience, even though the call center agent may not have direct access to the World Wide Web and is not necessarily even using a browser-based application.

Summary

The universal Internet based telephony system provides the following benefits:

1. The universal Internet based telephony system gives portal access to an Internet telephony network from anywhere on the Internet, thereby allowing customers to place calls over the Internet from any location, using any multimedia resident personal computer. In addition, new customers can create their own accounts dynamically without the need for complex subscription processes, since the Internet telephony call can be billed back to the customer through the Internet Service provider or a pre-existing long distance account.

2. WEB page owners, Internet Service Providers and other portal sites can resell Internet telephony services without having the equipment to implement the process. The WEB site URL is transmitted to the Internet telephony server to identify the source of the telephone call, thereby simplifying the billing process.

3. The transmitted URLs can be correlated to identify the calling and browsing patterns of individual customers, thereby creating a customer profile.

4. Customers can continue to browse on the Internet while using universal Internet based telephony system.

What is claimed:

1. A system for enabling a customer it initiate an Internet telephone call from any customer terminal device, comprising:
   means for displaying data, indicative of the presence of an Internet telephony service, on said customer terminal device;
   means, responsive to a customer selecting said Internet telephony service by responding to said data, for executing an Internet telephony service process for said customer terminal device; and
   means for assigning a customer served by said customer terminal device with a virtual telephone number, usable at any terminal device to participate in Internet telephone calls via said Internet telephone service.

2. The Internet telephone service system of claim 1 wherein said means for executing comprises:
   means, downloaded to said customer terminal device, for processing an Internet telephony script independent of an identity of said customer terminal device.

3. The Internet telephone service system of claim 1 wherein said means for executing comprises:
   means, responsive to data received from said customer terminal device pursuant to executing said Internet telephony service process and indicative of an identity of a destination communication device, for extending a communication connection from said customer terminal device to an Internet telephony server process corresponding to said data received from said customer terminal device.

4. The Internet telephone service system of claim 3 wherein said means for extending comprises:
   means, responsive to said destination communication device being served by said Internet telephony server process, for establishing said communication connection through said Internet telephony server process from said customer terminal device to said destination communication device.

5. The Internet telephone service system of claim 3 wherein said means for extending comprises:
   means, responsive to said destination communication device being served by a local exchange carrier of a Public Switched Telephone Network, for establishing said communication connection from said customer terminal device to said destination communication device through said Internet telephony server process and a Public Switched Telephone Network gateway system.

6. The Internet telephone service system of claim 3 wherein said means for extending comprises:
   means, responsive to said customer terminal device being connected via the Internet to a destination server and said destination communication device being served by a local exchange carrier of a Public Switched Telephone Network, for establishing a communication connection from said customer terminal device to said destination communication device through said Internet telephony server process and a Public Switched Telephone Network gateway system concurrent with said customer terminal device being connected via the Internet to a destination server.

7. A system for enabling a customer to initiate an Internet telephone call from any customer terminal device, comprising:
   means for displaying first data, indicative of the presence of an Internet telephony service, on said customer terminal device; and
   means for executing an Internet telephony service process for said customer terminal device, said means for executing being responsive to a customer selecting said Internet telephony service by responding to said first data;
   wherein said means for executing comprises means for extending a communication connection from said customer terminal device to an Internet telephony server process corresponding to said second data received from said customer terminal device, said means for executing being responsive to second data received from said customer terminal device pursuant to executing said Internet telephony service process and indicative of an identity of a destination communication device; and
   wherein said means for extending comprises means, responsive to said customer terminal device being a mobile subscriber station served by a wireless communication system, for establishing a communication connection from said customer terminal device to said destination communication device through said wireless communication system, said Internet telephony server process and a Public Switched Telephone Network gateway system.

8. The Internet telephone service system of claim 3 wherein said means for executing further comprises:
   means, responsive to said Internet telephony server extending said communication connection to said destination communication device, for monitoring a duration of said communication connection for billing purposes.

9. The Internet telephone service system of claim 1 wherein said means for executing comprises:
   means, responsive to a communication connection between said customer terminal device and said Internet telephony server process for transmitting an Internet telephony applet to said customer terminal device; and
   means for concurrently executing said Internet telephony applet with said web page on said customer terminal device.

10. The Internet telephone service system of claim 1 wherein said means for executing comprises:
    call management means for managing call routing, signaling, setup, tear down.

11. The Internet telephone service system of claim 10 wherein said means for executing further comprises:
    IP address mapping database means, responsive to said customer terminal device transmitting data indicative of an address for said selected destination terminal device, for determining a present location of a called party served by said selected destination terminal device; and
    call routing means for interconnecting said customer terminal device with said present location.

12. A method of providing an Internet telephone service to initiate an Internet telephone call from any customer terminal device, comprising the steps of:
    displaying data, indicative of the presence of an Internet telephony service, on said customer terminal device;
    executing, in response to a customer selecting said Internet telephony service by responding to said data, an Internet telephony service process for said customer terminal device; and assigning a customer served by said customer terminal device with a virtual telephone number, usable at any terminal device to participate in Internet telephone calls via said Internet telephone service.

13. The method of providing an Internet telephone service of claim 12 wherein said step of executing comprises:

processing an Internet telephony script, that is downloaded to said customer terminal device, independent of an identity of said customer terminal device.

14. The method of providing an Internet telephone service of claim 12 wherein said step of executing comprises:

extending, in response to data received from said customer terminal device pursuant to executing said Internet telephony service process and indicative of an identity of a destination communication device, a communication connection from said customer terminal device to an Internet telephony server process corresponding to said data received from said customer terminal device.

15. The method of providing an Internet telephone service of claim 14 wherein said step of extending comprises:

establishing, in response to said destination communication device being served by said Internet telephony server process, said communication connection through said Internet telephony server process from said customer terminal device to said destination communication device.

16. The method of providing an Internet telephone service of claim 14 wherein said step of extending comprises:

establishing, responsive to said destination communication device being served by a local exchange carrier of a Public Switched Telephone Network, said communication connection from said customer terminal device to said destination communication device through said Internet telephony server process and a Public Switched Telephone Network gateway system.

17. The method of providing an Internet telephone service of claim 14 wherein said step of extending comprises:

establishing, in response to said customer terminal device being connected via the Internet to a destination server and said destination communication device being served by a local exchange carrier of a Public Switched Telephone Network, a communication connection from said customer terminal device to said destination communication device through said Internet telephony server process and a Public Switched Telephone Network gateway system concurrent with said customer terminal device being connected via the Internet to a destination server.

18. A method of providing an Internet telephone service to initiate an Internet telephone call from any customer terminal device, comprising the steps of:

displaying first data, indicative of the presence of an Internet telephony service, on said customer terminal device;

executing, in response to a customer selecting said Internet telephony service by responding to said first data, an Internet telephony service process for said customer terminal device;

wherein the executing step includes extending, in response to second data received from said customer terminal device and indicative of an identity of a destination communication device, a communication connection from said customer terminal device to an Internet telephony server process corresponding to said data received from said customer terminal device; and wherein the extending step includes establishing, in response to said customer terminal device being a mobile subscriber station served by a wireless communication system, a communication connection from said customer terminal device to said destination communication device through said wireless communication system, said Internet telephony server process and a Public Switched Telephone Network gateway system.

19. The method of providing an Internet telephone service of claim 14 wherein said step of executing further comprises:

monitoring, in response to said Internet telephony server extending said communication connection to said destination communication device, a duration of said communication connection for billing purposes.

20. The method of providing an Internet telephone service of claim 12 wherein said step of executing comprises:

transmitting, in response to a communication connection between said customer terminal device sand said Internet telephony server process, an Internet telephony applet to said customer terminal device; and concurrently executing said Internet telephony applet with said web page on said customer terminal device.

21. The method of providing an Internet telephone service of claim 12 wherein said means for executing comprises:

call management means for managing call routing, signaling, set up, tear down.

22. The method of providing an Internet telephone service of claim 12 wherein said means for executing further comprises:

IP address mapping database means, responsive to said customer terminal device transmitting data indicative of an address for said selected destination terminal device, for determining a present location of a called party served by said selected destination terminal device; and call routing means for interconnecting said customer terminal device with said present location.

23. A method for remotely controlling a media setting comprising the steps of:

establishing a telephone call from an end user computer connected to a packet network to a telephone connected to a public switched telephone network, the telephone call being routed through a gateway connected to the packet network and the public switched telephone network, the gateway being operable to convert digital voice data packets received from the end user computer on the packet network to analog form for transmission over the public switched telephone network and to convert analog signals received from the telephone to digital voice data packets for transmission to the end user computer;

generating a dual tone multi-frequency signal at the telephone;

receiving the signal at the gateway;

transmitting a command message from the gateway to the end user computer; and changing a media setting at the end user computer in response to the command message, wherein the media setting is a microphone volume.

24. A method for remotely controlling a media setting comprising the steps of:

establishing a telephone call from an end user computer connected to a packet network to a telephone connected to a public switched telephone network, the telephone call being routed through a gateway connected to the packet network and the public switched telephone network, the gateway being operable to convert digital voice data packets received from the end user computer on the packet network to analog form for transmission over the public switched telephone network and to convert analog signals received from the telephone to digital voice data packets for transmission to the end user computer;

generating a dual tone multi-frequency signal at the telephone;

receiving the signal at the gateway;

transmitting a command message from the gateway to the end user computer; and changing a media setting at the end user computer in response to the command message, wherein the media setting is a speaker volume.

25. A method for remotely controlling a media setting comprising the steps of:

establishing a telephone call from an end user computer connected to a packet network to a telephone connected to a public switched telephone network, the telephone call being routed through a gateway connected to the packet network and the public switched telephone network, the gateway being operable to convert digital voice data packets received from the end user computer on the packet network to analog form for transmission over the public switched telephone network and to convert analog signals received from the telephone to digital voice data packets for transmission to the end user computer;

generating a dual tone multi-frequency signal at the telephone;

receiving the signal at the gateway;

transmitting a command message from the gateway to the end user computer; and changing a media setting at the end user computer in response to the command message, wherein the media setting is echo suppression.

26. A method for remotely controlling a media setting comprising the steps of:

establishing a telephone call from an end user computer connected to a packet network to a telephone connected to a public switched telephone network, the telephone call being routed through a gateway connected to the packet network and the public switched telephone network, the gateway being operable to convert digital voice data packets received from the end user computer on the packet network to analog form for transmission over the public switched telephone network and to convert analog signals received from the telephone to digital voice data packets for transmission to the end user computer;

generating a dual tone multi-frequency signal at the telephone;

receiving the signal at the gateway;

transmitting a command message from the gateway to the end user computer; and changing a media setting at the end user computer in response to the command message, wherein thee media setting is echo cancellation.

27. A method for remotely controlling a media setting comprising the steps of:

establishing a telephone call from an end user computer connected to a packet network to a telephone connected to a public switched telephone network, the telephone call being routed through a gateway connected to the packet network and the public switched telephone network the gateway being operable to convert digital voice data packets received from the end user computer on the packet network to analog form for transmission over the public switched telephone network and to convert analog signals received from the telephone to digital voice data packets for transmission to the end user computer;

generating a dual tone multi-frequency signal at the telephone;

receiving the signal at the gateway;

transmitting a command message from the gateway to the end user computer; and changing a media setting at the end user computer in response to the command message, wherein command message includes a new value for the media setting and the media setting is changed according to the new value in the changing step.

28. The method of claim 27, further comprising the steps of:

downloading a web page to the end user computer, the web page including an icon that, when activated, causes a program to be downloaded to the end user computer, the program being operable to establish an internet telephone call to be established between the end user computer and a predetermined telephone number corresponding to the telephone without the necessity of having internet telephony software installed on the end user computer; and activating the icon at the end user computer to perform the establishing step.

29. A method for remotely controlling a media setting comprising the steps of:

receiving first voice data from a calling party at a first computer;

converting the first voice data to first digital voice data packets at the first computer;

transmitting the first digital voice data packets to a second computer connected to the first computer through a packet network;

receiving second digital voice data packets from the second computer;

converting the second digital voice data packets to second voice data;

sending a command message from the first computer to the second computer; and changing a media setting at the second computer in response to the command message, wherein the media setting is a speaker volume.

30. A method for remotely controlling a media setting comprising the steps of:

receiving first voice data from a calling party at a first computer;

converting the first voice data to first digital voice data packets at the first computer;

transmitting the first digital voice data packets to a second computer connected to the first computer through a packet network;

receiving second digital voice data packets from the second computer;

converting the second digital voice data packets to second voice data;

sending a command message from the first computer to the second computer; and changing a media setting at the second computer in response to the command message, wherein the media setting is echo suppression.

31. A method for remotely controlling a media setting comprising the steps of:
   receiving first voice data from a calling party at a first computer;
   converting the first voice data to first digital voice data packets at the first computer;
   transmitting the first digital voice data packets to a second computer connected to the first computer through a packet network;
   receiving second digital voice data packets from the second computer;
   converting the second digital voice data packets to second voice data;
   sending a command message from the first computer to the second computer; and
   changing a media setting at the second computer in response to the command message, wherein the media setting is echo cancellation.

32. A method for remotely controlling a media setting comprising the steps of:
   receiving first voice data from a calling party at a first computer;
   converting the first voice data to first digital voice data packets at the first computer;
   transmitting the first digital voice data packets to a second computer connected to the first computer through a packet network;
   receiving second digital voice data packets from the second computer;
   converting the second digital voice data packets to second voice data;
   sending a command message from the first computer to the second computer; and
   changing a media setting at the second computer in response to the command message, wherein the media setting is a microphone volume.

33. A method for remotely controlling a media setting comprising the steps of:
   receiving first voice data from a calling party at a first computer;
   converting the first voice data to first digital voice data packets at the first computer;
   transmitting the first digital voice data packets to a second computer connected to the first computer through a packet network;
   receiving second digital voice data packets from the second computer;
   converting the second digital voice data packets to second voice data;
   sending a command message from the first computer to the second computer; and
   changing a media setting at the second computer in response to the command message, wherein command message includes a new value for the media setting and the media setting is changed according to the new value in the changing step.

34. A method for remotely controlling a media setting comprising the steps of:
   receiving first voice data from a calling party at a first computer;
   converting the first voice data to first digital voice data packets at the first computer;
   transmitting the first digital voice data packets to a second computer connected to the first computer through a packet network;
   receiving second digital voice data packets from the second computer;
   converting the second digital voice data packets to second voice data;
   sending a command message from the first computer to the second computer;
   changing a media setting at the second computer in response to the command message,
   downloading a web page to the end user computer, the web page including an icon that, when activated, causes a program to be downloaded to the end user computer, the program being operable to establish an internet telephone call to be established between the end user computer and a predetermined telephone number corresponding to the telephone without the necessity of having internet telephony software installed on the end user computer; and
   activating the icon at the end user computer to perform the establishing step.

35. A method for identifying an end user computer connected to a data packet network to called party equipment connected to a public switched telephone network comprising the steps of:
   collecting, at the end user terminal, customer identification information;
   transmitting the customer identification information to a first server;
   storing the customer identification information at the first server;
   establishing a phone call between an end user terminal and called party equipment, the call being routed through a gateway connected to the data packet network and the public switched telephone network;
   detecting a gateway identifier at the called party equipment;
   sending the gateway identifier to the first server;
   using the gateway identifier to retrieve the customer identification information at the first server; and
   sending the customer identification information from the first server to the called party equipment,
   wherein the gateway identifier is in an automatic number identification service format.

36. The method of claim 35, further comprising the step of displaying data associated with the customer identification information on a display associated with the called party.

37. The method of claim 35, wherein the customer identification information is collected from cookie information sent by the second server and stored at the end user terminal.

38. A method for controlling a display of an end user terminal comprising the steps of:
   establishing a phone call between an end user terminal connected to a data packet network and other party equipment connected to a public switched telephone network, the phone call being routed through a gateway connected to the data packet network and the public switched telephone network;

generating a dual tone multi-frequency (DTMF) command at the other party equipment; detecting the DTMF command;

forming an address based at least in part on the DTMF command;

receiving display information from the address at the end user terminal; and sending a request for display information to the address.

39. A method for providing an Internet telephone service to initiate an Internet telephone call from a mobile subscriber station comprising the steps of:

displaying first data, indicative of the presence of an Internet telephony service, on said mobile subscriber station;

receiving, in response to a user of the mobile subscriber station selecting said Internet telephony service by responding to said first data, second data indicative of an identity of a destination communication device; and connecting, in response to the user of the mobile subscriber station selecting said Internet telephony service by responding to said first data, the mobile subscriber station to the destination communication device through the wireless communication system and a Public Switched Telephone Network gateway system.

\* \* \* \* \*